US008019308B2

(12) United States Patent
Endo et al.

(10) Patent No.: US 8,019,308 B2
(45) Date of Patent: Sep. 13, 2011

(54) RECEIVING APPARATUS

(75) Inventors: Takayuki Endo, Tokyo (JP); Hiroyuki Nagahama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 603 days.

(21) Appl. No.: 12/087,015

(22) PCT Filed: Oct. 23, 2006

(86) PCT No.: PCT/JP2006/321062

§ 371 (c)(1), (2), (4) Date: Jun. 24, 2008

(87) PCT Pub. No.: WO2007/086174

PCT Pub. Date: Aug. 2, 2007

(65) Prior Publication Data

US 2009/0275303 A1 Nov. 5, 2009

(30) Foreign Application Priority Data

Jan. 25, 2006 (JP) ................................ 2006-016458

(51) Int. Cl.
*H04B 1/10* (2006.01)

(52) U.S. Cl. ........... 455/307; 455/296; 375/324; 381/13

(58) Field of Classification Search ................. 455/63.1, 455/67.13, 77, 114.2, 120, 125, 178.1, 296, 455/307; 375/324; 381/2, 13
See application file for complete search history.

(56) References Cited

U.S. PATENT DOCUMENTS

| | | | | |
|---|---|---|---|---|
| 4,368,355 | A | 1/1983 | Ichikawa | |
| 5,204,973 | A * | 4/1993 | Sugayama | 455/212 |
| 2005/0123083 | A1* | 6/2005 | Kawakami | 375/347 |

FOREIGN PATENT DOCUMENTS

| | | | |
|---|---|---|---|
| JP | 62-23161 | Y2 | 6/1987 |
| JP | 62-23162 | Y2 | 6/1987 |
| JP | 5-28841 | Y2 | 7/1993 |
| JP | 6-14524 | Y2 | 4/1994 |
| JP | 6-189225 | A | 7/1994 |
| JP | 11-317683 | A | 11/1999 |
| JP | 2005-5819 | A | 1/2005 |

* cited by examiner

*Primary Examiner* — Nhan Le
(74) *Attorney, Agent, or Firm* — Birch, Stewart, Kolasch & Birch, LLP.

(57) ABSTRACT

A receiving apparatus 10 includes a stereo blend control unit 21 for carrying out a stereo blend process according to the reception state of a broadcast wave, a pilot detecting unit 18 for detecting a pilot signal included in the broadcast wave, and a high cut control unit 22 for carrying out high cut control according to the reception state of the broadcast wave and for carrying out the high cut control when the pilot signal is not detected by the pilot detecting unit.

5 Claims, 5 Drawing Sheets

RECEIVING APPARATUS

FIELD OF THE INVENTION

The present invention relates to a receiving apparatus which receives a broadcast wave and which outputs a demodulated signal in which noise is reduced. More particularly, it relates to a radio receiver which is mounted in a moving object, such as a vehicle, and which cuts noise excellently without impairing audibility.

BACKGROUND OF THE INVENTION

In general, a receiving apparatus (a radio receiver) which receives a radio broadcast wave (e.g., an AM broadcast wave and an FM broadcast wave) is mounted in a moving object, such as a vehicle. In such a vehicle-mounted receiving apparatus, because the surrounding environment of the moving object varies from moment to moment according to the movement of the moving object, there occurs a situation in which the vehicle-mounted receiving apparatus cannot receive a radio broadcast excellently while receiving the radio broadcast because of noise mixed into the radio broadcast, the noise resulting from a change in the received field strength, neighboring interference, multipath interference, and so on.

In order to avoid the occurrence of such a situation, a vehicle-mounted radio receiver reduces the noise by performing functions, such as so-called high cut control (High Cut Control), stereo blend control (Stereo Blend Control) and softmute control (Softmute Control).

For example, there has been provided a vehicle-mounted radio receiver which, in order to implement an appropriate operating state irrespective of the presence or absence of an adjacent station, detects an adjacent station having a carrier frequency adjacent to the reception frequency by using an adjacent station detector, and, when detecting such an adjacent station, changes the control of input/output characteristics, such as a channel separation characteristic, a blend characteristic, a high cut characteristic, and a softmute characteristic (for example, see patent reference 1).

[Patent reference 1] JP,2005-5819,A (pp. 5 to 9 and FIGS. 1 to 13)

Because conventional receiving apparatuses are constructed as mentioned above, if noise which disables them to detect the received field strength, the neighboring interference, and the multipath interference is mixed, the high cut control does not work and, as a result, the noise cannot be cut and therefore the audibility is impaired. For example, because the neighboring interference becomes low inevitably when the received field strength is high (medium field strength or high field strength), it is determined whether to perform the high cut control according to the multipath interference, and, when the received field strength is high, the high cut control becomes difficult to run and therefore it becomes impossible to cut the noise excellently.

A further problem is that when the received field strength is high and the multipath interference is low, the high cut control does not run even in a state in which stereo demodulation cannot be performed excellently, and, as a result, mixing of noise occurs and the audibility is impaired.

The present invention is made in order to solve the above-mentioned problems, and it is therefore an object of the present invention to provide a receiving apparatus which carries out noise cut excellently according to the state of the stereo demodulation irrespective of the neighboring interference and the multipath interference without impairing the audibility.

DISCLOSURE OF THE INVENTION

A receiving apparatus in accordance with the present invention is characterized in that the receiving apparatus includes: a reception state detecting means for detecting a reception state of a broadcast wave; a pilot signal detecting means for detecting a pilot signal included in the broadcast wave; and a high cut control means for carrying out high cut control on the basis of the pilot signal detected by the pilot signal detecting means.

Because the receiving apparatus according to the present invention is constructed in such a way as to carry out the high cut control on the basis of the detected pilot signal, the receiving apparatus can carries out the noise cut excellently according to the state of the stereo demodulation irrespective of the neighboring interference and the multipath interference, and, as a result, does not impair the audibility.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
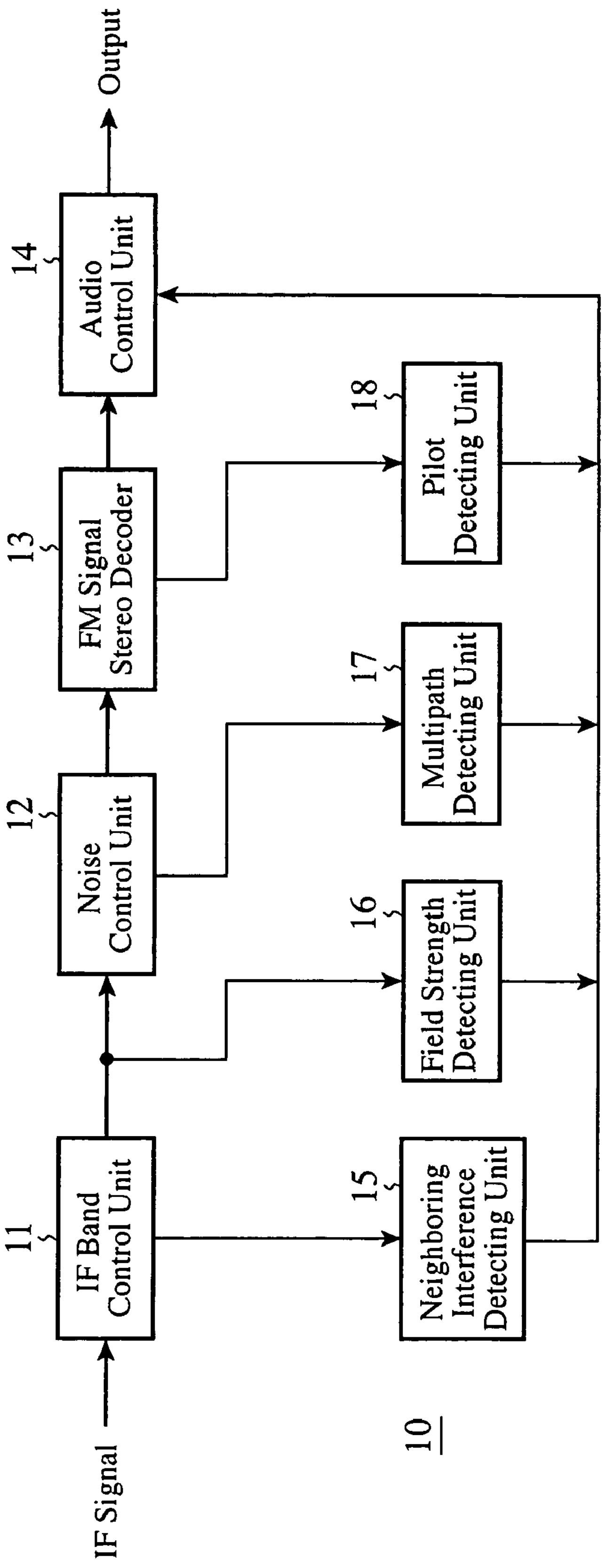
FIG. 1 is a block diagram showing an example of a receiving apparatus in accordance with Embodiment 1 of the present invention.

First, referring to FIG. 1, a receiving apparatus 10 illustrated is a radio receiver mounted in a moving object such as a vehicle (in the illustrated example, a receiver which receives an FM broadcast wave is shown). The receiving apparatus 10 is provided with an IF band control unit 11 to which an intermediate frequency signal (an IF signal) is provided from a tuner not illustrated, a noise control unit 12, an FM signal stereo decoder 13, an audio control unit 14, a neighboring interference detecting unit (a neighboring interference detecting means) 15, a field strength detecting unit (a field strength detecting means) 16, a multipath detecting unit (a multipath noise detecting means) 17, and a pilot detecting unit (a pilot signal detecting means) 18. A reception state detecting means for detecting the reception state of a broadcast wave is comprised of the neighboring interference detecting unit 15, the field strength detecting unit 16, and the multipath detecting unit 17.

The tuner extracts a desired frequency component from an arrival broadcast wave received by an antenna (not shown), converts the desired frequency component into an IF signal, and provides this IF signal to the IF band control unit 11. The IF band control unit 11 restricts the band of the IF signal so as to make the IF signal have a predetermined frequency band (more specifically, the IF band control unit 11 performs frequency conversion on the IF signal and outputs a frequency-converted IF signal).

The IF band control unit 11 provides the IF signal to the neighboring interference detecting unit 15, and the neighboring interference detecting unit 15 detects the presence or absence of a neighboring interference wave having a carrier frequency which is defined beforehand for the reception frequency. For example, the neighboring interference detecting unit 15 extracts a beat component by using a band pass filter, and provides a neighboring-interference-amount signal indicating the percentage of neighboring interference (%) on the basis of this beat component to the audio control unit 14.

The output (the IF signal) of the IF band control unit 11 is provided to the field strength detecting unit 16. The field strength detecting unit 16 detects the received field strength of the broadcast wave corresponding to the IF signal. For example, the field strength detecting unit performs AM detection on the IF signal by making the IF signal pass through a low pass filter, and provides an S meter signal having avoltage level corresponding to the received field strength to the audio control unit 14.

The output (the IF signal) of the IF band control unit 11 is provided to the noise control unit 12, and, after noise suppression control is performed on the IF signal by this noise control unit, the noise-suppressed IF signal is provided to the FM signal stereo decoder 13. The FM signal stereo decoder 13 then performs FM signal demodulation on the noise-suppressed IF signal, and provides the FM demodulated signal to the audio control unit 14.

The output (the noise-suppressed IF signal) of the noise control unit 12 is provided to the multipath detecting unit 17, and the multipath detecting unit 17 detects the percentage of multipath interference (the amount of multipath interference). For example, the multipath detecting unit 17 extracts a high-frequency distortion component of the noise-suppressed IF signal by using a band pass filter, and provides a multipath-interference-amount signal indicating the percentage of multipath interference on the basis of the high-frequency distortion component to the audio control unit 14.

The output of the FM signal stereo decoder 13 is further provided to the pilot detecting unit 18, and the presence or absence of the pilot signal included in the FM-demodulated signal is detected by this pilot detecting unit (more specifically, whether or not the pilot signal has been demodulated is detected). When detecting the pilot signal, the pilot detecting unit 18 provides a pilot detection signal to the audio control unit 14.

Figure 2:
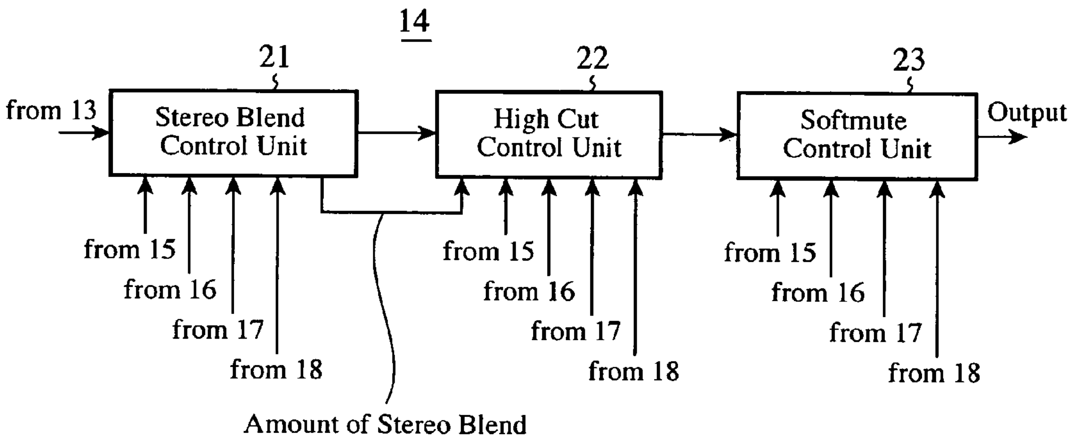
FIG. 2 is a block diagram showing in detail the structure of an audio control unit shown in FIG. 1.

Referring to FIG. 2, the audio control unit 14 includes a stereo blend control unit (a stereo blend control means) 21, a high cut (High-Cut) control unit (a high cut control means) 22, and a softmute control unit (a softmute control means) 23, and the above-mentioned neighboring-interference-amount signal, the above-mentioned S meter signal, the above-mentioned multipath-amount signal, and the above-mentioned pilot detection signal are provided to the stereo blend control unit 21, the high cut control unit 22, and the softmute control unit 23.

First, the above-mentioned FM-demodulated signal is provided to the stereo blend control unit 21, and the stereo blend control unit 21 performs a blend process of blending L (left) data and R (right) data (this blend process includes a process of changing a stereophonic playback to a monophonic playback) on the FM-demodulated signal according to the neighboring-interference-amount signal, the S meter signal, the multipath-amount signal, and the pilot detection signal, as will be mentioned later, and provides the blend-processed demodulated signal to the high cut control unit 22.

The stereo blend control unit 21 further provides a stereo blend signal indicating an amount of stereo blend generated at the time of the stereo blend process to the high cut control unit 22. The high cut control unit 22 then performs the high cut control on the blend-processed demodulated signal according to the neighboring-interference-amount signal, the S meter signal, the multipath-amount signal, and the pilot detection signal and the stereo blend signal, and provides the high-cut-processed demodulated signal to the softmute control unit 23, as will be mentioned later.

The softmute control unit 23 performs a softmute process of attenuating the output level (e.g., reducing the sound volume) on the high-cut-processed demodulated signal according to the neighboring-interference-amount signal, the S meter signal, the multipath-amount signal, and the pilot detection signal, and outputs the mute-processed demodulated signal. The mute-processed demodulated signal is then outputted as a receiver output signal.

Next, the operation of the receiving apparatus will be explained.

Figure 3:
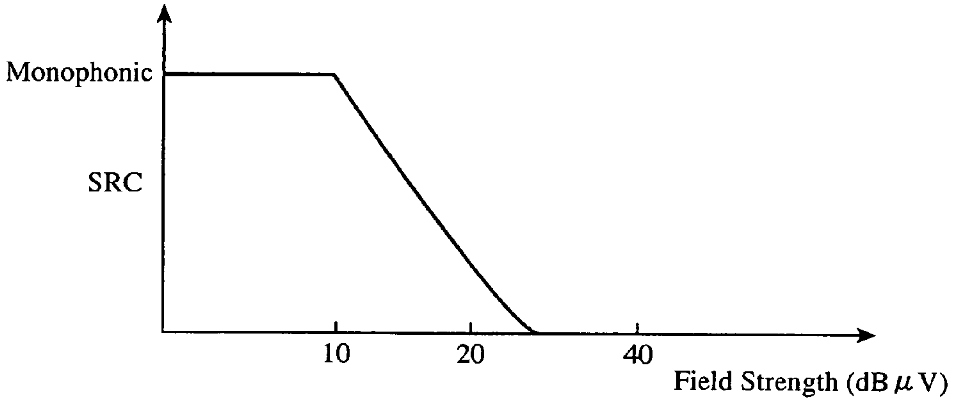
FIG. 3 is a diagram showing a relation between an amount of stereo blend and a received field strength which is used by the receiving apparatus shown in FIG. 1.

Referring to FIG. 2, a stereo-blend-vs.-field-strength table (simply referred to as a field strength table from here on) shown in FIG. 3 is set up in the stereo blend control unit 21, and, in this field strength table, the horizontal axis shows the field strength (dBμV) and the vertical axis shows the amount (SRC) of stereo blend. As can be seen from the figure, as the field strength approaches zero (i.e., when the noise increases), the amount of stereo blend increases and the sound finally becomes monophonic.

Figure 4:
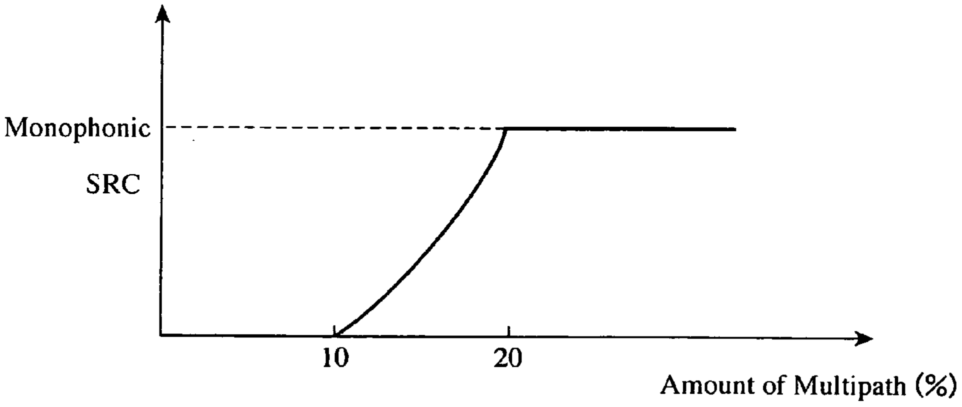
FIG. 4 is a diagram showing a relation between the amount of stereo blend and an amount of multipath which is used by the receiving apparatus shown in FIG. 1.

A stereo-blend-vs.-multipath table (simply referred to as a multipath table from here on) shown in FIG. 4 is set up in the stereo blend control unit 21, and, in this multipath table, the horizontal axis shows the amount of multipath (percentage: %) and the vertical axis shows the amount of stereo blend. As can be seen from the figure, as the amount of multipath increases (i.e., when the noise increases), the amount of stereo blend increases and the sound finally becomes monophonic.

Although not illustrated, a stereo-blend-vs.-neighboring-interference table (simply referred to as a neighboring interference table from here on) showing a relation between the amount of neighboring interference (percentage: %) and the amount of stereo blend is set up in the stereo blend control unit 21. This neighboring interference table is similar to the multipath table.

The stereo blend control unit 21 acquires the amount of stereo blend (this amount of stereo blend is referred to as the first amount of stereo blend) from the field strength table according to the S meter signal. Similarly, the stereo blend control unit 21 acquires the amount of stereo blend (this amount of stereo blend is referred to as the second amount of stereo blend) from the multipath table according to the multipath-amount signal, and also acquires the amount of stereo blend (this amount of stereo blend is referred to as the third amount of stereo blend) from the neighboring interference table according to the neighboring-interference-amount signal.

Next, the stereo blend unit 21 calculates a general amount of stereo blend according to the first through third amounts of stereo blend (for example, the stereo blend unit averages the first through third amounts of stereo blend and defines the average as the general amount of stereo blend). The stereo blend control unit 21 then performs the blend process on the FM-demodulated signal according to the general amount of stereo blend so as to acquire the blend-processed demodulated signal, and provides this blend-processed demodulated signal to the high cut control unit 22.

Figure 5:
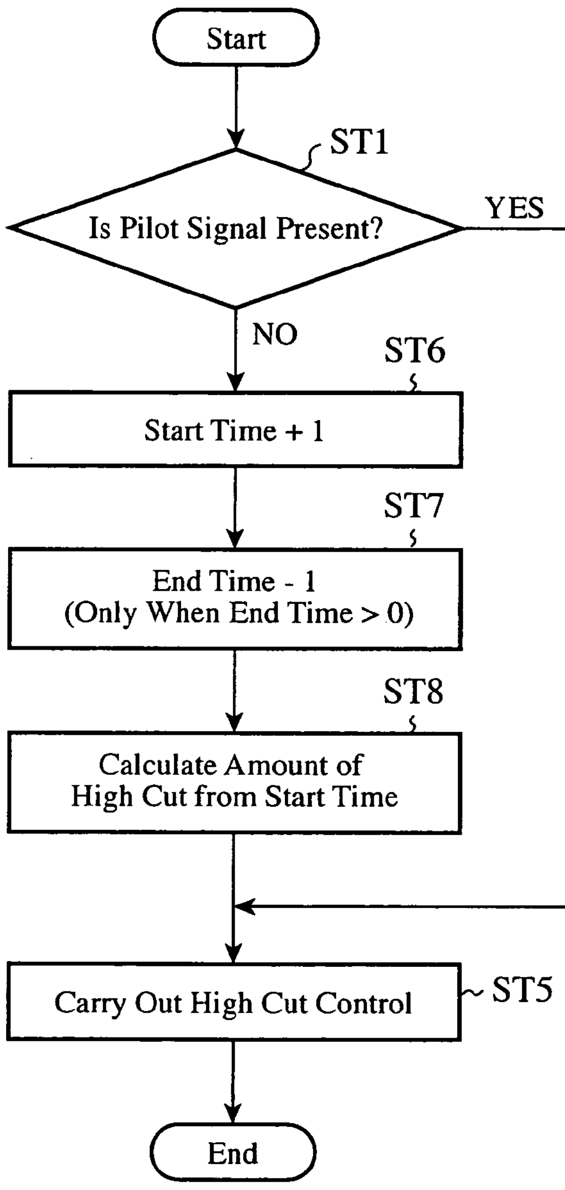
FIG. 5 is a flow chart for explaining an example of the operation of the receiving apparatus shown in FIG. 1 at a time of performing high cut control.

Referring also to FIG. 5, the high cut control unit 22 monitors the pilot detection signal (step ST1), and controls the execution of the high cut control according to the presence or absence of the pilot detection signal. The high cut control unit 22 carries out the high cut control according to the multipath-amount signal, the neighboring-interference-amount signal, and the S meter signal (more specifically, the high cut control unit carries out the high cut control when the noise component increases).

When the pilot detection signal indicates the presence of the pilot signal, the high cut control unit 22 sets the end time of the high cut control to (the end time+1) (step ST2), also sets the start time to start the high cut to (the start time−1) (step ST3), and acquires a current amount of high cut from the end time (step ST4). The high cut control unit 22 then carries out the high cut control according to this amount of high cut control (step ST5).

In contrast, when the pilot detection signal, in step ST1, indicates the absence of the pilot signal, the high cut control unit 22 sets the start time to start the high cut to (the start time+1) (step ST6), also sets the end time to end the high cut to (the end time−1) (step ST7), and acquires the current amount of high cut from the start time (step ST8). The high cut control unit 22 then, in step ST5, carries out the high cut control according to this amount of high cut control.

By thus carrying out the high cut control according to the presence or absence of the pilot signal, the receiving apparatus carries out the high cut control according to the presence or absence of the pilot signal even when the received field strength is high and noise is mixed. Therefore, the audibility is not impaired.

Figure 6:
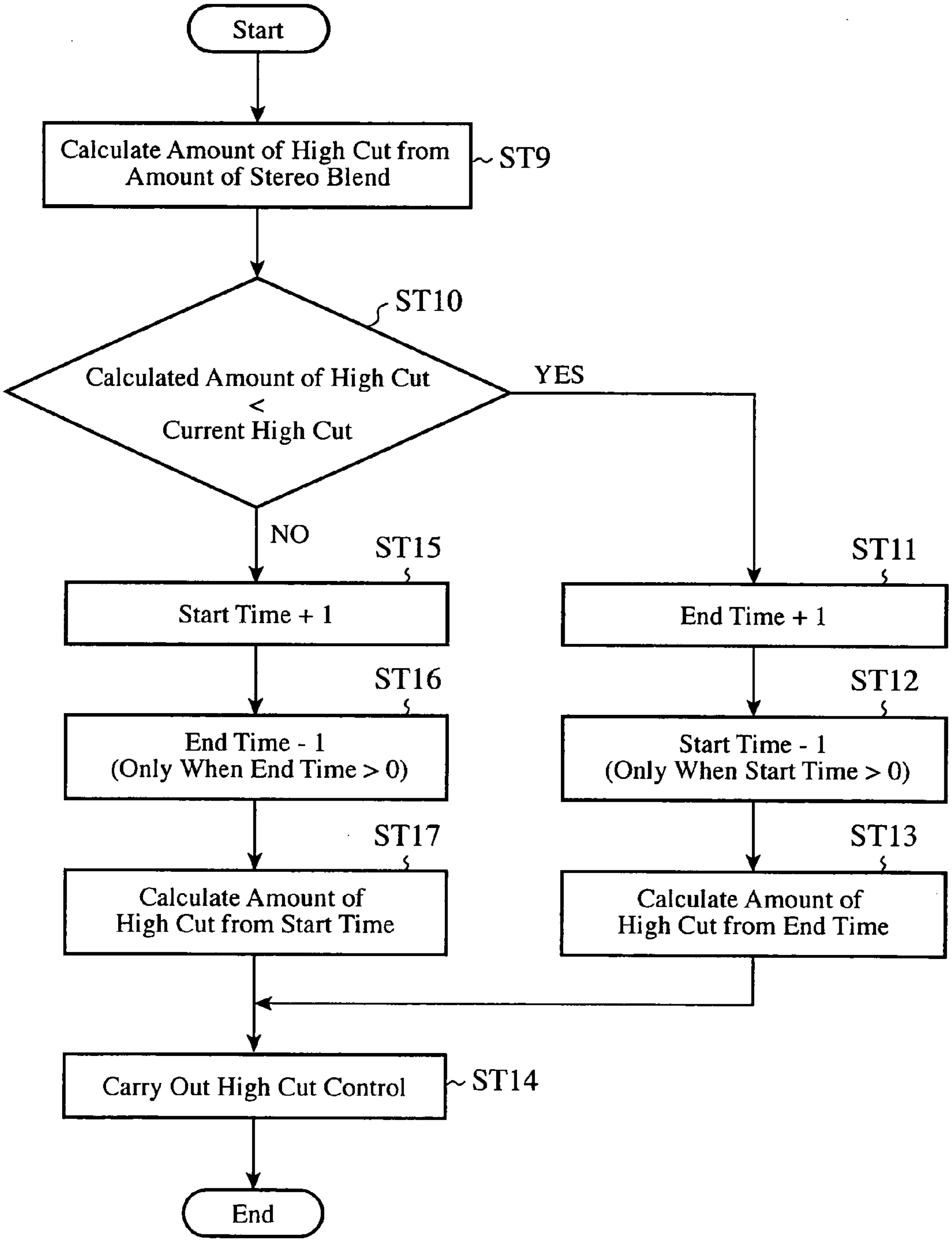
FIG. 6 is a flow chart for explaining another example of the operation of the receiving apparatus shown in FIG. 1 at a time of performing high cut control.
Figure 7:
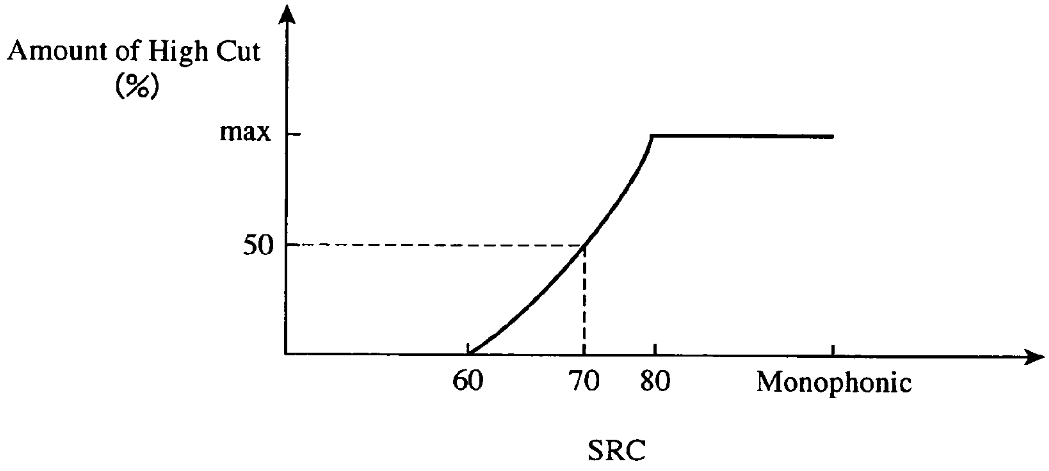
FIG. 7 is a diagram showing a relation between the amount of stereo blend and an amount of high cut control which is used by the receiving apparatus shown in FIG. 1.

Referring now to FIGS. 2 and 6, the stereo blend control unit 21 provides the general amount of stereo blend to the high cut control unit 22 when not receiving the pilot detection signal, i.e., when no pilot signal is detected. A high-cut-vs.-stereo-blend table (simply referred to as a high cut table from here on) shown in FIG. 7 is set up in the high cut control unit 22.

In this high cut table, the horizontal axis shows the amount of stereo blend, and the vertical axis shows the amount of high cut control. As the amount of stereo blend increases, (i.e., as the noise increases), the amount of high cut increases and the amount of high cut finally reaches 100%. The high cut control unit 22 then refers to the high cut table, and acquires, as a calculated amount of high cut control, the amount of high cut control on the basis of the general amount of stereo blend (step ST9).

Next, the high cut control unit 22 compares the calculated amount of high cut control with the current amount of high cut (step ST10), and, when the calculated amount of high cut control<the current amount of high cut, the high cut control unit 22 sets the end time of the high cut control to (the end time+1) (step ST11), also sets the start time to start the high cut to (the start time−1) (step ST12), and acquires the current amount of high cut from the end time (step ST13). The high cut control unit 22 then carries out the high cut control according to this amount of high cut control (step ST14).

In contrast, when, in step ST10, the calculated amount of high cut control >=the current amount of high cut, the high cut control unit 22 sets the start time to start the high cut to (the start time+1) (step ST15), also sets the end time to end the high cut to (the end time−1) (step ST16), and acquires the current amount of high cut from the start time (step ST17). The high cut control unit 22 then, in step ST14, carries out the high cut control according to this amount of high cut control.

Figure 8:
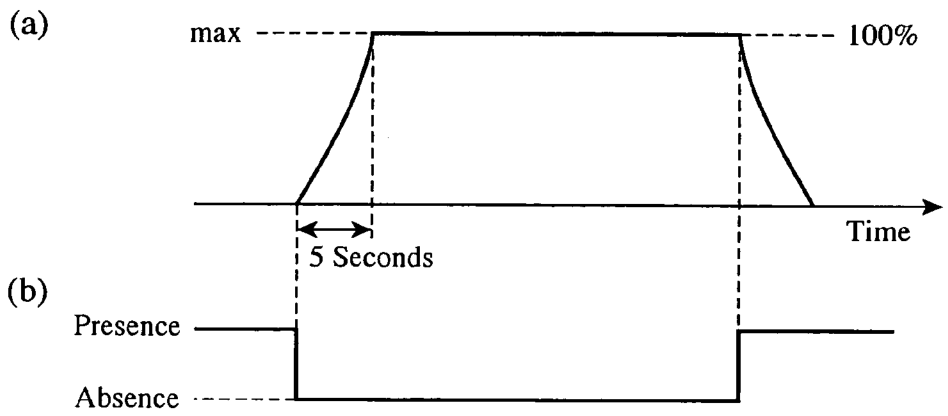
FIG. 8 is a diagram showing a relation between a pilot signal and high cut control, and (a) is a diagram for explaining a rise and a fall of the high cut control and (b) is a diagram showing the presence or absence of the pilot signal.

When performing the high cut control according to both the presence or absence of the pilot signal and the amount of stereo blend, the high cut control unit uses the presence or absence of the pilot signal as a trigger of the start or end of the high cut control and acquires the amount of high cut control (a Cut-off frequency) from the amount of stereo blend. When starting the high cut control and when ending the high cut control, as shown in FIGS. 8(*a*) and 8(*b*), the high cut control unit starts and ends the high cut control after time lags, respectively (i.e., when carrying out the high cut control, the high cut control unit activates the high cut control gradually, and, when ending the high cut control, the high cut control unit deactivates the high cut control gradually).

By activating or deactivating the high cut control in this way, the high cut control unit can prevent the high cut control from becoming unsteady in a case in which the presence and absence of the pilot signal alternate frequently. By thus performing the high cut control according to the amount of stereo blend, the receiving apparatus can perform the high cut control according to the amount of stereo blend even when the received field strength is high and noise is mixed, and therefore the audibility is not impaired.

When the pilot detection signal is provided to the softmute control unit 23, but the softmute control unit does not accept the pilot detection signal, that is, when no pilot signal is detected, the high-cut-processed demodulated signal can be softmute-processed.

As mentioned above, because the receiving apparatus according to this Embodiment 1 detects the pilot signal included in the demodulated signal, but, when not detecting the pilot signal (that is, when the receiving apparatus cannot demodulate the pilot signal), the receiving apparatus carries out the high cut control, the receiving apparatus provides an advantage of being able to carry out the high cut control and to reduce the noise excellently without impairing the audibility even in a case in which there exists noise which cannot be detected from the multipath interference and the neighboring interference.

Because the receiving apparatus according to this Embodiment 1 carries out the high cut control according to the amount of stereo blend generated by the stereo blend control unit 21 when the pilot signal is not detected, the receiving apparatus can carry out the high cut control even if the noise is low when the received field strength is high (medium electric field strength or high electric field strength) As a result, the receiving apparatus offers an advantage of being able to make the audibility be good in a case of medium electric field strength or high electric field strength.

Because the receiving apparatus according to this Embodiment 1 detects the pilot signal from the demodulated signal at the time of demodulating the received broadcast wave, the receiving apparatus does not demodulate the pilot signal when the pilot signal cannot be detected. As a result, the receiving apparatus offers an advantage of being able to judge that noise is mixed into the demodulated signal.

Because in the receiving apparatus according to this Embodiment 1 the stereo blend control unit 21 is placed as a stage preceding the high cut control unit 22 and the soft mute control unit 23, the receiving apparatus offers an advantage of being able to judge the mixing of noise with the amount of stereo blend generated by stereo blend control unit 21, and to substantially detect the noise which cannot be detected from the neighboring interference, the received field strength, and the multipath interference through the detection of the pilot signal and with the amount of stereo blend.

INDUSTRIAL APPLICABILITY

As mentioned above, the receiving apparatus in accordance with the present invention which performs noise cut excellently when the receiving environment varies from moment to moment is suitable for use in a radio receiver which receives a radio broadcast wave (e.g., an AM broadcast wave and an FM broadcast wave) or the like which is mounted in a moving object, such as a vehicle.

The invention claimed is:

1. A receiving apparatus comprising:

a reception state detecting unit which detects a reception state of a broadcast wave;

a pilot signal detecting unit which detects a pilot signal included in said broadcast wave; and a high cut control unit which carries out high cut control on a basis of the pilot signal detected by said pilot signal detecting unit; wherein the reception state detecting unit includes a stereo blend control unit which carries out a stereo blend process according to the reception state detected by the reception state detecting unit, and wherein the high cut control unit carries out the high cut control according to the amount of stereo blend from said stereo blend control unit when the pilot signal is not detected by the pilot signal detecting unit.

2. The receiving apparatus according to claim 1, wherein the reception state detecting unit includes a field strength detecting unit which detects a received field strength of the received broadcast wave, a multipath noise detecting unit which detects, as a noise level, a level of multipath noise, and a neighboring interference detecting unit which detects, as an interference level, a level of a neighboring interference wave, and wherein the stereo blend control unit generates an amount of stereo blend indicating a rate of a stereo blend according to said received field strength, said noise level, and said interference level, and carries out the stereo blend process according to this amount of stereo blend.

3. The receiving apparatus according to claim 1, wherein the pilot signal detecting unit detects the pilot signal from a demodulated signal which said apparatus obtains by demodulating the received broadcast wave.

4. The receiving apparatus according to claim 3, wherein the stereo blend control unit performs the stereo blend process on the demodulated signal to output a blend-processed demodulated signal, and the high cut control unit performs the high cut control on said blend-processed demodulated signal to output a high-cut-processed demodulated signal, and said receiving apparatus has a softmute control unit which performs a mute process on said high-cut-processed demodulated signal according to the reception state detected by the reception state detecting unit.

5. The receiving apparatus according to claim 4, wherein the softmute control unit carries out a softmute process when the pilot signal is not detected by the pilot signal detecting unit.

* * * * *